(12) United States Patent
Oki et al.

(10) Patent No.: US 9,075,430 B2
(45) Date of Patent: Jul. 7, 2015

(54) COORDINATE INFORMATION UPDATING DEVICE AND COORDINATE INFORMATION GENERATING DEVICE

(75) Inventors: Eiji Oki, Fuchu (JP); Naoaki Yamanaka, Kokubunji (JP); Yutaka Arakawa, Fukuoka (JP)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 237 days.

(21) Appl. No.: 13/392,966

(22) PCT Filed: Apr. 26, 2011

(86) PCT No.: PCT/US2011/034000
§ 371 (c)(1),
(2), (4) Date: Feb. 28, 2012

(87) PCT Pub. No.: WO2011/152930
PCT Pub. Date: Dec. 8, 2011

(65) Prior Publication Data
US 2012/0154269 A1    Jun. 21, 2012

(30) Foreign Application Priority Data
May 31, 2010   (JP) .................................. 2010-124275

(51) Int. Cl.
*G06F 3/041*   (2006.01)
*G06F 3/01*    (2006.01)
*G06F 3/0481*  (2013.01)

(52) U.S. Cl.
CPC .............. *G06F 3/01* (2013.01); *G06F 3/04815* (2013.01)

(58) Field of Classification Search
None
See application file for complete search history.

(56) References Cited

U.S. PATENT DOCUMENTS

2005/0176486 A1   8/2005   Nishimura et al.
2005/0267676 A1   12/2005  Nezu et al.
(Continued)

FOREIGN PATENT DOCUMENTS

JP   03-208120 A   9/1991
JP   08-129447 A   5/1996
(Continued)

OTHER PUBLICATIONS

Yasuhiro Takaki "Development of Human-Friendly Three-Dimensional Information Display and Its Practical Use", Tokyo University of Agriculture and Technology,—http://www.soumu.go.jp/main_sosiki/joho_tsusin/scope/event/hl9yokousyu/session6/sangakukan1.pdf retrieved on Feb. 24, 2012.
(Continued)

*Primary Examiner* — Nicholas Lee
(74) *Attorney, Agent, or Firm* — Maschoff Brennan

(57) ABSTRACT

An object can be displayed on a screen of a two-dimensional coordinate system based on xyz-coordinate values of the object in a three-dimensional coordinate system, operation information of a two-dimensional coordinate system with respect to the object can be received from an input device, and whether the operation information is in accordance with a predetermined rule or not is determined. If the operation information is not in accordance with the predetermined rule, xy-coordinate values of the object can be updated in accordance with the operation information. If the operation information is in accordance with the predetermined rule, a z-coordinate value of the object can be updated in accordance with the operation information.

15 Claims, 10 Drawing Sheets

(56) References Cited

U.S. PATENT DOCUMENTS

| | | | |
|---|---|---|---|
| 2006/0026536 A1 | 2/2006 | Hotelling et al. | |
| 2006/0116203 A1* | 6/2006 | Nakada et al. | 463/30 |
| 2006/0128468 A1 | 6/2006 | Yoshikawa et al. | |
| 2006/0256081 A1* | 11/2006 | Zalewski et al. | 345/156 |
| 2006/0279554 A1 | 12/2006 | Shin et al. | |
| 2007/0018968 A1* | 1/2007 | Iwamoto et al. | 345/173 |
| 2009/0085935 A1 | 4/2009 | Yamashita et al. | |
| 2009/0251432 A1* | 10/2009 | Wang et al. | 345/173 |
| 2009/0265670 A1* | 10/2009 | Kim et al. | 715/863 |
| 2009/0303231 A1* | 12/2009 | Robinet et al. | 345/419 |
| 2010/0095249 A1 | 4/2010 | Yoshikawa et al. | |
| 2010/0110025 A1* | 5/2010 | Lim | 345/173 |
| 2010/0220978 A1 | 9/2010 | Ogikubo | |
| 2011/0109581 A1 | 5/2011 | Ozawa et al. | |

FOREIGN PATENT DOCUMENTS

| | | |
|---|---|---|
| JP | 08-171453 A | 7/1996 |
| JP | 2006-053707 A | 2/2006 |
| JP | 2007-264852 A | 10/2007 |
| JP | 2008-541222 A | 11/2008 |
| JP | 2010-271774 A | 12/2010 |

OTHER PUBLICATIONS

Mac Funamizu, "Designs for the Better World" http://petitinvention.wordpress.com/2009/08/19/3d-desktop-concept/, retrieved on Feb. 24, 2012.

International Search Report dated Dec. 22, 2011 as received in application No. PCT/US2011/034000.

Written Opinion Report dated Dec. 22, 2011 as received in application No. PCT/US2011/034000.

Yasuhiro Takaki "Development of Human-Friendly Three-Dimensional Information Display and Its Practical Use", Tokyo University of Agriculture and Technology,—http://www.soumu.go.jp/main_sosiki/joho_tsusin/scope/event/hl9yokousyu/session6/sangakukanl.pdf retrieved on Feb. 24, 2012.

H. Zhang et al. "Computer graphics using Java 2D and 3D" Publisher: Prentice Hall; 1 edition (Dec. 16, 2006) pp. 32,33, and 70-81.

David Salomon "Computer graphics and geometric modeling" Publisher: Springer; 1 edition (May 28, 1999) pp. 91-102 and 700-702.

Mark A. Willis, "3-D Computer Graphics Perspective Drawing With the Computer," Publisher: Entelek, Incorporated (Jul. 1983) pp. 19-28 and 115-127.

Office Action mailed Feb. 4, 2014 in U.S. Appl. No. 13/791,692.

\* cited by examiner

FIG. 3
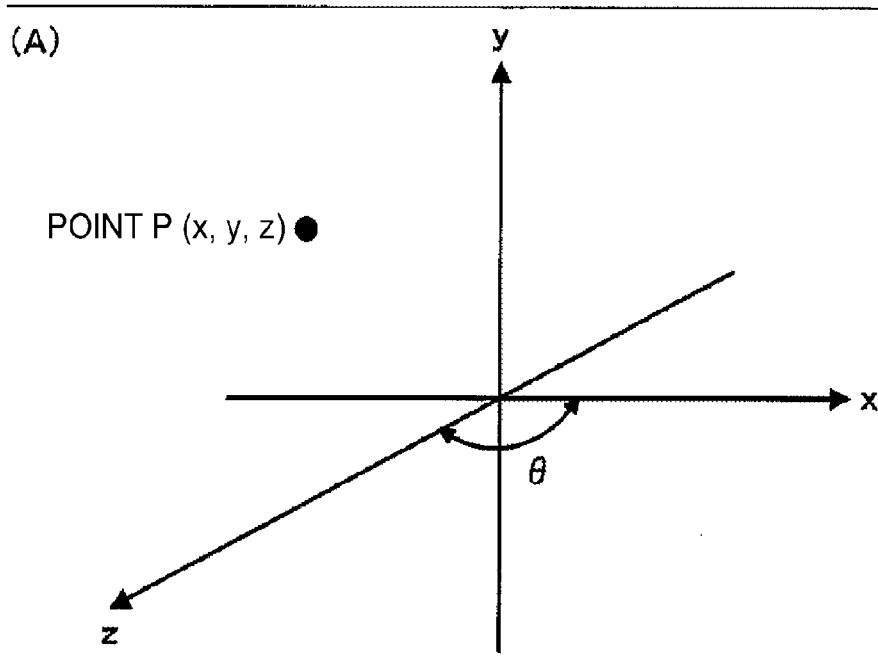
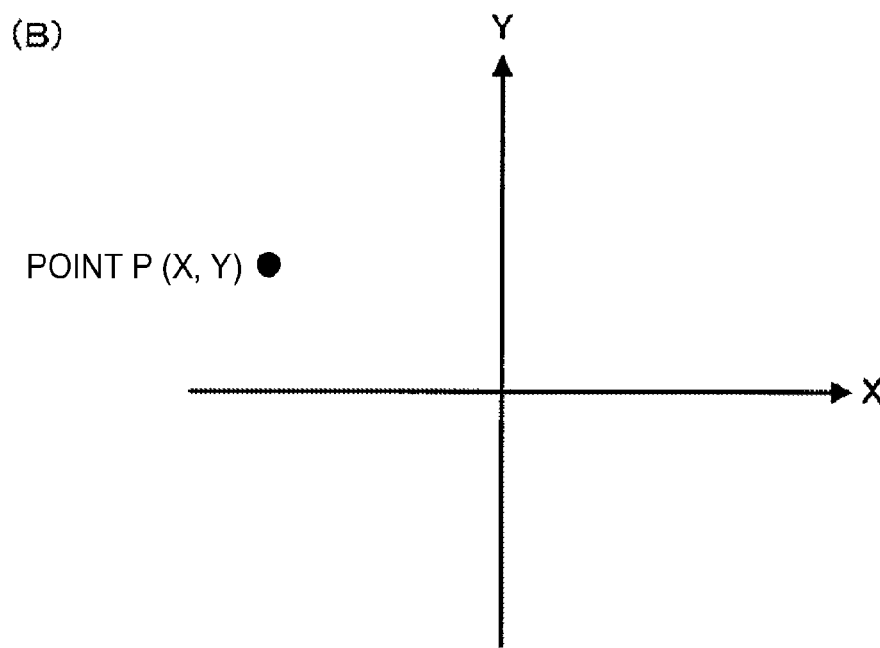

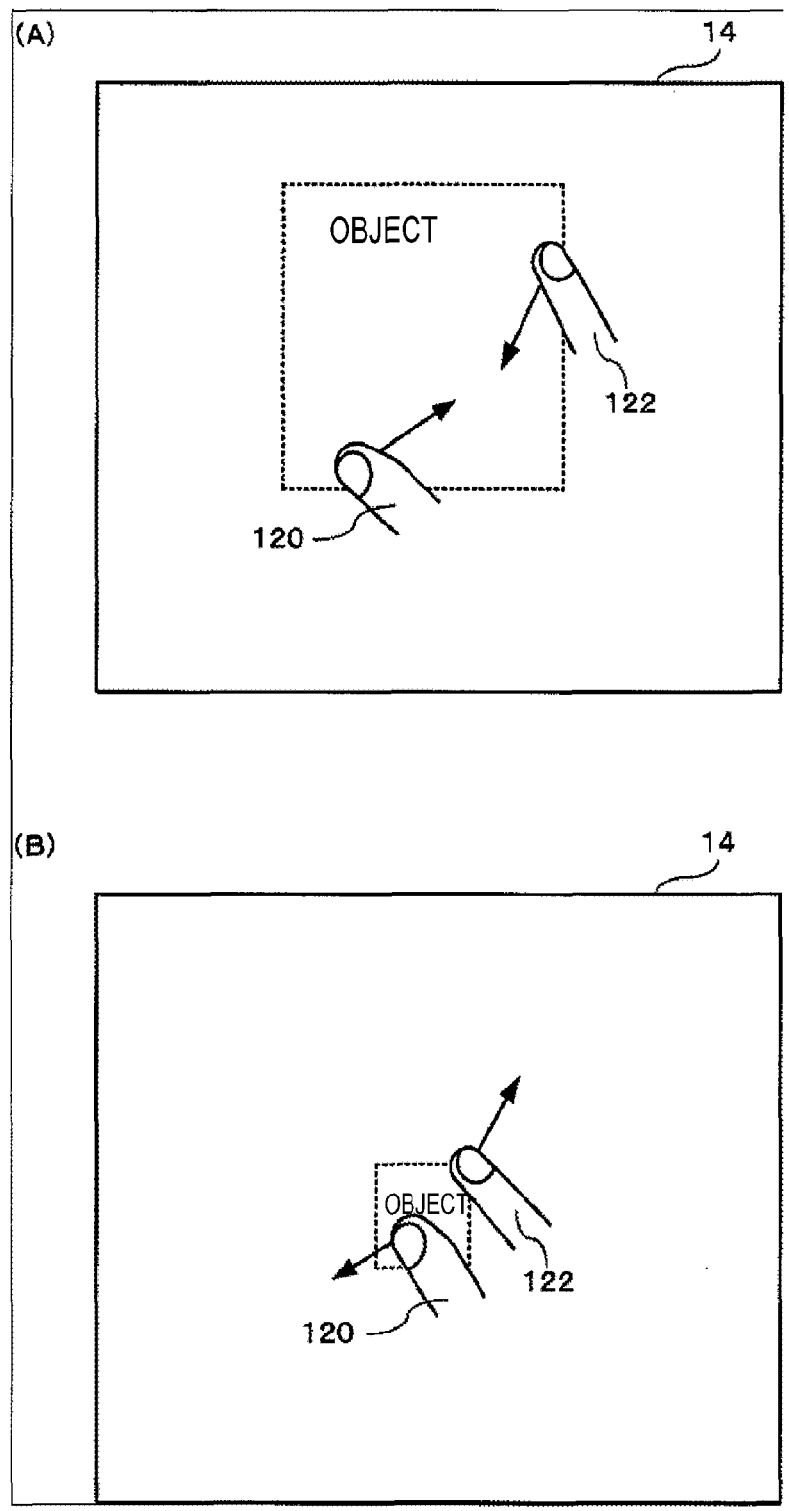

COORDINATE INFORMATION UPDATING DEVICE AND COORDINATE INFORMATION GENERATING DEVICE

CROSS-REFERENCE TO RELATED APPLICATIONS

The present application is a U.S national stage filing under 35 U.S.C. 371 of International Application No. PCT/US2011/034000, filed on Apr. 26, 2011, which in turn claims the benefit under 35 U.S.C. 119(a) of Japanese Application No. 2010-124275, filed on May 31, 2010.

BACKGROUND

Recently, images showing three-dimensional objects are generated because of development of computer graphics techniques. The screens of various electronic devices such as personal computers, mobile phones, and TVs use a two-dimensional coordinate system; therefore, the coordinate values of the objects of a three-dimensional coordinate system are displayed on the screens after being converted to those of the two-dimensional coordinate system. In order to carry out operations of the three-dimensional coordinate system with respect to the three-dimensional objects which are two-dimensionally shown in this manner, for example, a special mouse described in the art is capable of handling the operations of the three-dimensional coordinate system.

SUMMARY

However, an input device used by a general electronic device is a general mouse, touchpad, or the like which outputs the operation information of the two-dimensional coordinate system. Therefore, in such an electronic device, in order to make a transition to an operation of the three-dimensional coordinate system when carrying out an operation of the two-dimensional coordinate system, a switching operation is required in addition to the operation of the two-dimensional coordinate system, which is cumbersome. For example, in the state in which a three-dimensional object two-dimensionally shown on a screen is selected by the input device, in other words, in the state in which the object is clicked by a mouse or tapped by a touchpad, when the input device is two-dimensionally moved, the x-coordinate value and the y-coordinate value of the object are changed in accordance with the movement. If the z-coordinate value of the object is required to be changed at this point, first, the selected state of the object is cancelled once, and an operation of giving an order to carry out the operation of the z-coordinate is then carried out. Then, the object is selected again; and, when the input device is two-dimensionally moved, the z-coordinate value of the object can be changed.

Therefore, easily carrying out the processing with respect to the coordinate values of an object in the three-dimensional coordinate system by using an input device capable of outputting the operation information of the two-dimensional coordinate system is desired.

A coordinate information updating device of the present disclosure includes: a coordinate storing unit configured for storing a coordinate value of an object in a three-dimensional coordinate system (x, y, z); a two-dimensional converting unit configured for converting xyz-coordinate values to coordinate values of a two-dimensional coordinate system (X, Y) and displaying the converted coordinate values on a screen; an operation information receiving unit configured for receiving operation information of the two-dimensional coordinate system with respect to the object from an input device; an operation information determining unit configured for determining whether the operation information is in accordance with a predetermined rule or not; and a coordinate updating unit configured for, based on a result of the determination of the operation information determining unit, if the operation information is not in accordance with the predetermined rule, updating the xy-coordinate values of the object in accordance with the operation information and, if the operation information is in accordance with the predetermined rule, updating a z-coordinate value of the object in accordance with the operation information.

In the coordinate information updating device of the present disclosure, the predetermined rule may be a rule that a trajectory of XY-coordinate values corresponding to the operation information includes a predetermined trajectory.

In the coordinate information updating device of the present disclosure, the predetermined rule may be a rule that the trajectory of XY-coordinate values corresponding to the operation information includes the predetermined trajectory within a predetermined period of time.

In the coordinate information updating device of the present disclosure, the predetermined rule may be a rule that the trajectory of the XY-coordinate values corresponding to the operation information continuously includes the predetermined trajectory a plurality of times.

In the coordinate information updating device of the present disclosure, the predetermined trajectory may be a trajectory reaching an end point within a predetermined range via a point distant from a start point by a predetermined distance or more, a distance of the end point within the predetermined range from the start point being shorter than the predetermined distance.

In the coordinate information updating device of the present disclosure, the predetermined trajectory may be an approximately-circular trajectory.

In the coordinate information updating device of the present disclosure, the predetermined rule may be a rule that a plurality of trajectories of XY-coordinate values corresponding to the operation information include a predetermined trajectory.

In the coordinate information updating device of the present disclosure, the predetermined rule may be a rule that the plurality of trajectories of the XY-coordinate values corresponding to the operation information include the predetermined trajectory within a predetermined period of time.

In the coordinate information updating device of the present disclosure, when the operation information is determined to be in accordance with the predetermined rule, the coordinate updating unit may update the z-coordinate value of the object based on a distance and a direction of a trajectory of XY-coordinate values corresponding to the operation information after the determination.

In the coordinate information updating device of the present disclosure, the coordinate updating unit may update the z-coordinate value of the object based on the distance, the direction, and a speed of the trajectory of the XY-coordinate values corresponding to the operation information.

In the coordinate information updating device of the present disclosure, the coordinate updating unit may update the z-coordinate value of the object in accordance with the operation information after the determination that the trajectory of the XY-coordinate values includes the predetermined trajectory.

A coordinate information generating device of the present disclosure includes: an operation information receiving unit configured for receiving from an input device operation information of a two-dimensional coordinate system with respect to an object displayed on a screen of a two-dimensional coordinate system (X, Y); a coordinate generating unit configured for generating a z-coordinate value of the object in a three-dimensional coordinate system (x, y, z) based on the operation information and generating xy-coordinate values of the object based on the z-coordinate value; and a coordinate storing unit configured for storing the xyz-coordinate values of the object generated by the coordinate generating unit.

In the coordinate information generating device of the present disclosure, the operation information may include XY-coordinate information specifying XY-coordinate values of the object and z-coordinate information for generating a z-coordinate value of the object; and the coordinate generating unit may generate the z-coordinate value of the object based on the z-coordinate information and generate the xy-coordinate values based on the z-coordinate value and the XY-coordinate information.

In the coordinate information generating device of the present disclosure, the coordinate generating unit may generate the z-coordinate value of the object based on a distance and a direction of a trajectory of the XY-coordinate values corresponding to the z-coordinate information.

In the coordinate information generating device of the present disclosure, the trajectory of the XY-coordinate values corresponding to the z-coordinate information may include an approximately-circular trajectory.

In the present specification, "unit" includes a unit realized by hardware, a unit realized by software, and a unit realized by using both of them. One unit may be realized by using two or more hardware, and two or more units may be realized by one piece of hardware.

BRIEF DESCRIPTION OF DRAWINGS

FIG. 3 includes a drawing showing an example of a point P (x, y, z) in a three-dimensional coordinate system and the point P (X, Y) converted to a two-dimensional coordinate system.

FIG. 10 includes a drawing showing an example of switching to the updating process of the z-coordinate value by a plurality of trajectories of coordinate values of the two-dimensional coordinate system.

DETAILED DESCRIPTION

Figure 1:
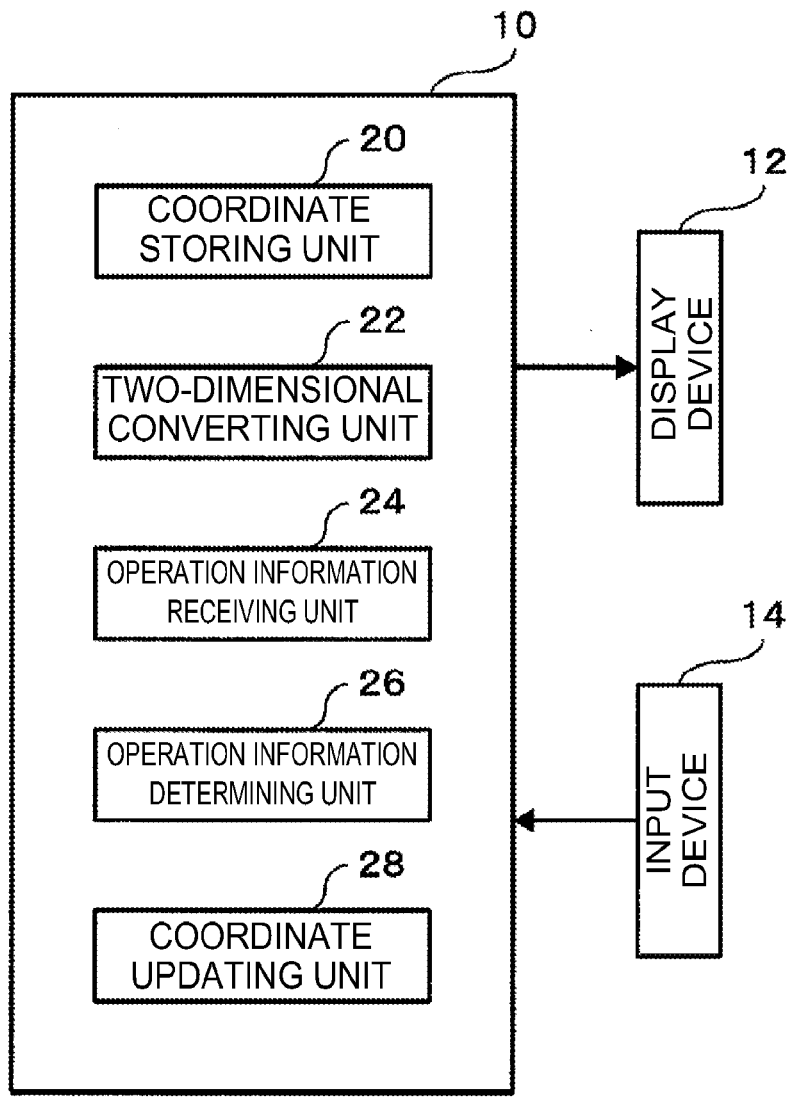
FIG. 1 includes a drawing showing an example of the functional configuration of a coordinate information updating device.

FIG. 1 is a drawing showing the functional configuration of a coordinate information updating device, which is an embodiment of the present disclosure. The coordinate information updating device 10 is an electronic device capable of updating the coordinate values of a three-dimensional object, which is two-dimensionally displayed by a display device 12, in a three-dimensional coordinate system (x, y, z) in accordance with operation information of a two-dimensional coordinate system (X, Y) output from an input device 14, and the coordinate information updating device is, for example, a personal computer or the like. Herein, the display device 12 is a device capable of displaying images by the two-dimensional coordinate system and is a liquid crystal display, an organic EL display, or the like. The input device 14 is a device capable of outputting the operation information of the two-dimensional coordinate system and is a mouse, a touch panel, a touchpad, or the like. The coordinate information updating device 10 may be composed integrally with the display device 12 and the input device 14 like, for example, a mobile terminal, a TV, or the like.

Figure 2:
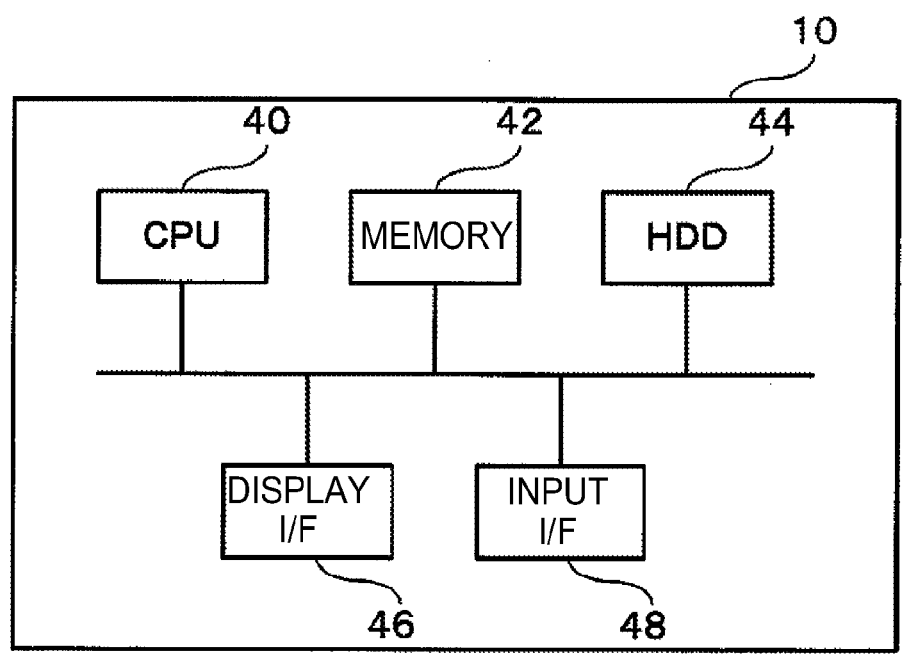
FIG. 2 includes a drawing showing a hardware configuration example of the coordinate information updating device.

As shown in FIG. 1, the coordinate information updating device 10 is composed of: a coordinate storing unit 20, a two-dimensional converting unit 22, an operation information receiving unit 24, an operation information determining unit 26, and a coordinate updating unit 28. FIG. 2 is a drawing showing an example of the hardware configuration of the coordinate information updating device 10. As shown in FIG. 2, the coordinate information updating device 10 can be composed of: a CPU 40, a memory 42, a hard disk drive 44, a display interface 46, and an input interface 48. The coordinate storing unit 20 can be composed by using the memory 42 or the hard disk drive 44. The two-dimensional converting unit 22, the operation information receiving unit 24, the operation information determining unit 26, and the coordinate updating unit 28 can be realized when the CPU 40 executes one or more programs stored in the memory 42.

The coordinate storing unit 20 stores the coordinate values of the object in the three-dimensional coordinate system. In other words, the x-axis, y-axis, and z-axis coordinate values of the points specifying the position of the object are stored in the coordinate storing unit 20. Herein, the points specifying the position of the object are, for example, the center point, vertices, etc. of the object. Note that the three-dimensional coordinate system (x, y, z) can be arbitrarily set, and the system is not limited to the orthogonal coordinate system, but may be a polar coordinate system.

The two-dimensional converting unit 22 converts the coordinate values of the three-dimensional coordinate system to the coordinate values of the two-dimensional coordinate system, thereby two-dimensionally displaying the three-dimensional object by the display device 12 via the display interface 46. In other words, the two-dimensional converting unit 22 converts the coordinate values (x, y, z) of a point P, which is two-dimensionally displayed in a pseudo manner as shown in FIG. 3 (a), in the three-dimensional coordinate system to the coordinate values (X, Y) in the two-dimensional coordinate system as shown in FIG. 3 (b). Herein, as shown in FIG. 3 (a), when the angle formed by the x-axis and the z-axis when the three-dimensional coordinate system is two-dimensionally displayed in the pseudo manner is θ, the coordinate values (X, Y) of the point P in the two-dimensional coordinate system can be obtained by $X=x-z\cdot\cos\theta, Y=y-z\cdot\sin\theta$.

The operation information receiving unit 24 receives the operation information of the two-dimensional coordinate system with respect to the object displayed by the display device 12 from the input device 14 via the input interface 48. Herein, the input device 14 is a device capable of outputting the two-dimensional coordinate system with respect to the object, in other words, X-axis/Y-axis operation information and is a mouse, touchpad, a touch panel, or the like.

Depending on whether the operation information received by the operation information receiving unit 24 is in accordance with a predetermined rule or not, the operation information determining unit 26 determines whether the operation information represents the operation with respect to XY-coordinate values, in other words, xy-coordinate values or the operation with respect to the z-coordinate value.

Specifically, the operation information determining unit 26 determines whether the trajectory of the XY-coordinate values corresponding to the operation information is a predetermined trajectory or not. In the present embodiment, when the trajectory of the XY-coordinate values corresponding to the operation information has a clockwise approximately-circular shape as exemplified in FIG. 4 (a), the operation information determining unit 26 determines that the operation is intended to change the z-coordinate value of the object in a positive direction. When the trajectory of the XY-coordinate values corresponding to the operation information has an anticlockwise approximately-circular shape as exemplified in FIG. 4 (b), the operation information determining unit 26 determines that the operation is intended to change the z-coordinate value of the object in a negative direction. The reason therefor is that the operation in which an operation start position and an operation end position are not different from each other in the two-dimensional coordinate system (X,Y) is unnatural as an operation for moving the object, and the possibility of carrying out such an operation when the xy-coordinate values are to be updated is conceived to be low.

Note that the operation information determining unit 26 may determine that the operation information is in accordance with a predetermined rule when the trajectory of the two-dimensional coordinate values corresponding to the operation information continuously form an approximately-circular trajectory a plurality of times within predetermined period of time. By virtue of this, the determination accuracy of the operation information determining unit 26 can be improved.

Figure 5:
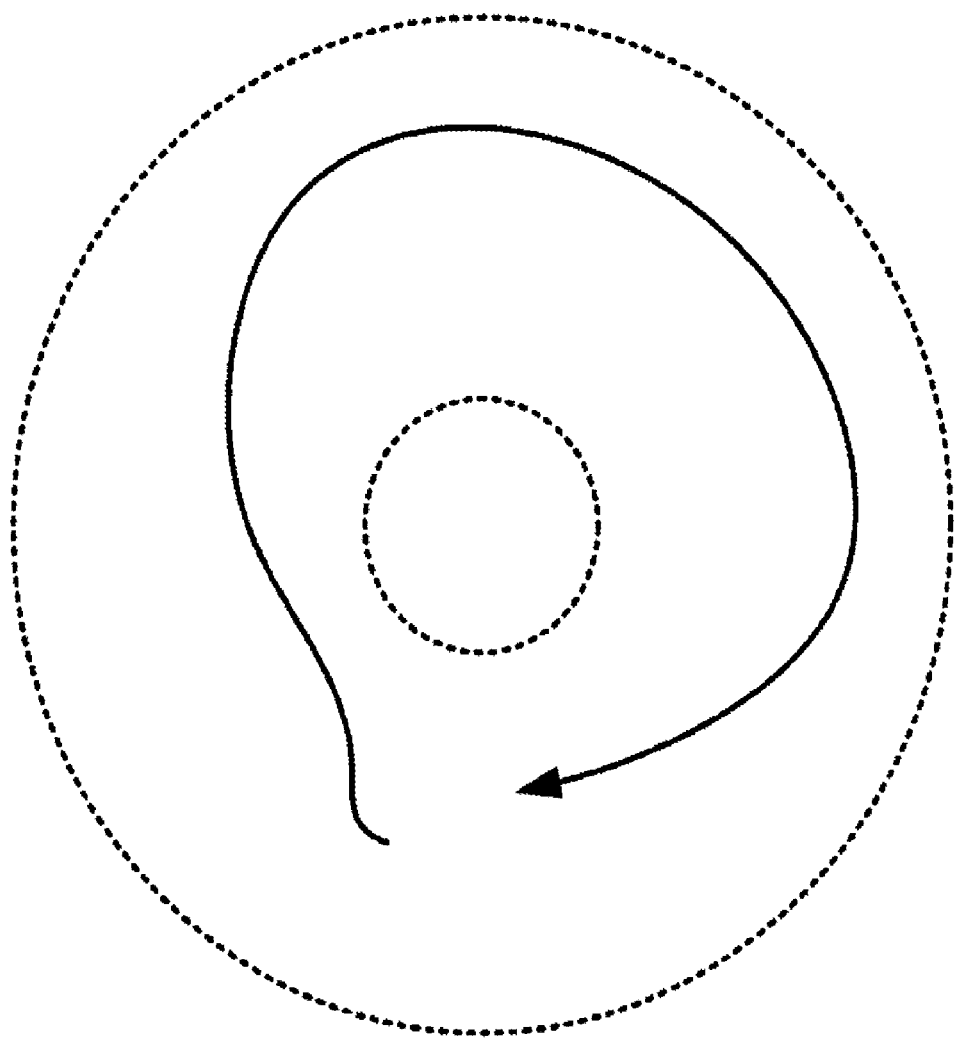
FIG. 5 includes a drawing showing an example of the method for determining that the trajectory of the coordinate values of the two-dimensional coordinate system of the operation information is an approximately-circular trajectory.

Herein, whether the trajectory of the two-dimensional coordinate values corresponding to the operation information is approximately circular or not can be determined depending on, for example, whether the trajectory of the two-dimensional coordinate values corresponding to the operation information is included between two circles having a common center point and mutually-different radii as shown by the broken lines in FIG. 5. Note that the determination of the approximately-circular trajectory by the operation information determining unit 26 is not limited thereto.

Figure 4:
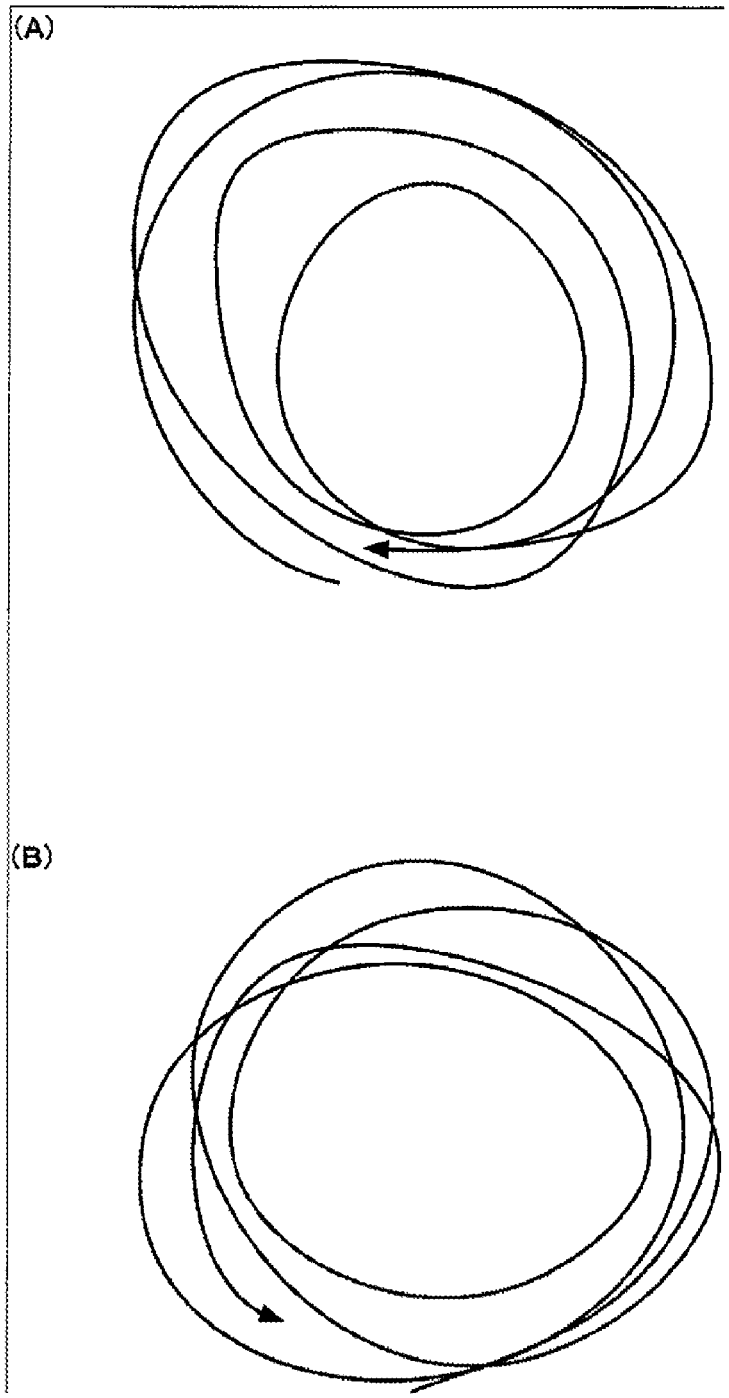
FIG. 4 includes a drawing showing examples of the trajectory of the coordinate values of the two-dimensional coordinate system of the operation information for changing a z-coordinate value.

The coordinate updating unit 28 updates the xy-coordinate values or the z-coordinate value with respect to the object displayed by the two-dimensional coordinate system based on the determination result of the operation information determining unit 26. For example, in the case in which the z-coordinate value is to be updated by the clockwise or anti-clockwise approximately-circular operation as shown in FIG. 4, the coordinate updating unit 28 updates the z-coordinate value based on the distance, direction, and speed of the trajectory of the XY-coordinate values corresponding to the operation information. For example, if the trajectory of the XY-coordinate values corresponding to the operation information is circular, the change amount of the z-coordinate value can be caused to be proportional to the number of rotation of the circles. Alternatively, for example, even when the number of rotation of the trajectory of the XY-coordinate values corresponding to the operation information is the same, the change amount of the z-coordinate value per one rotation can be changed in accordance with the moving speed thereof. In other words, for example, even if the circles have the same trajectory, the change amount of the z-coordinate value per one rotation can be caused to be small when the speed is slow, and the change amount of the z-coordinate value per one rotation can be caused to be large when the speed is fast. Note that the speed may be an angular speed or linear speed. Alternatively, for example, even when the number of rotation of the trajectory of the XY-coordinate values corresponding to the operation information is the same, the change amount of the z-coordinate value per one rotation can be changed in accordance with the size of the circle.

Figure 6:
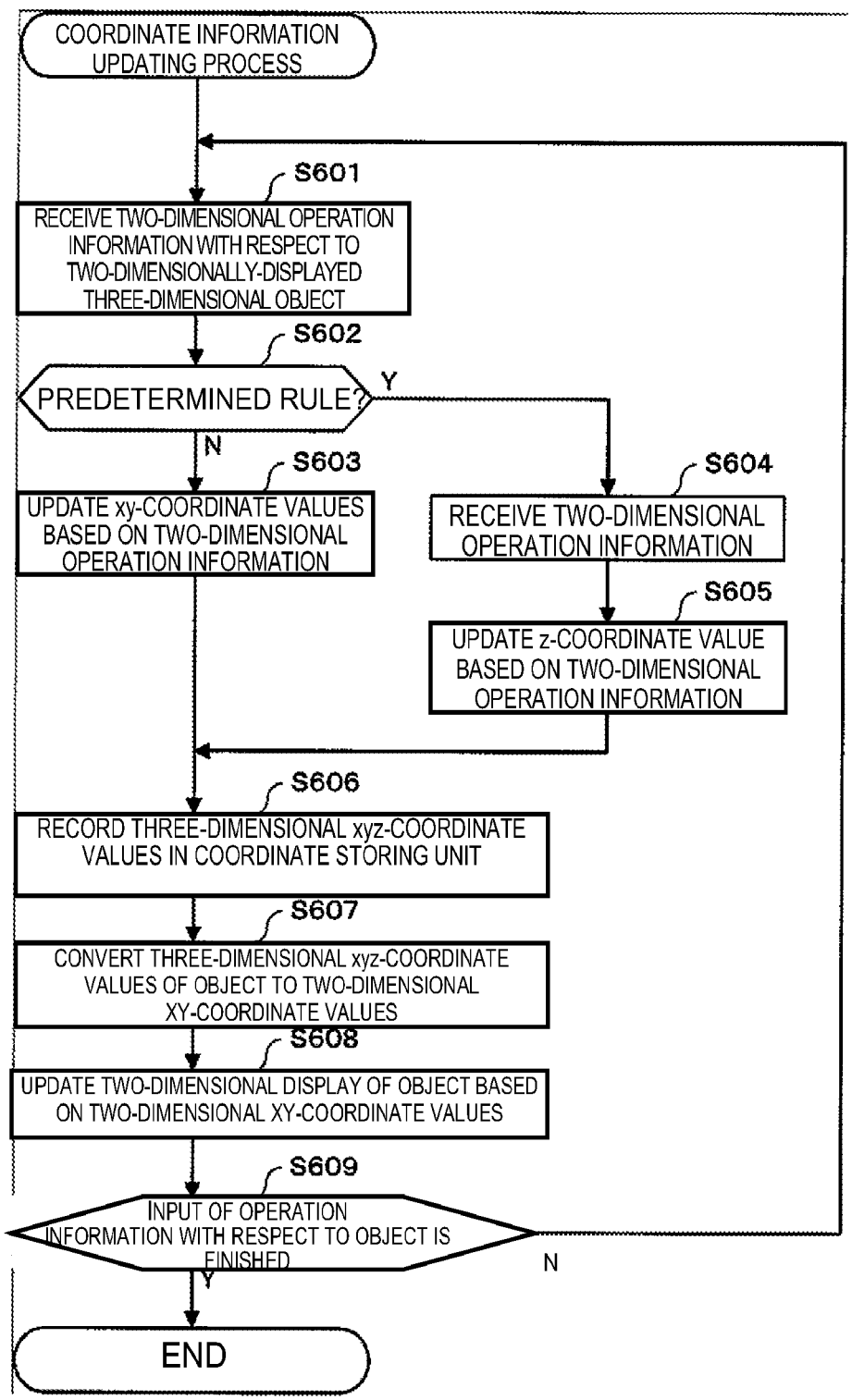
FIG. 6 includes a flow chart showing an example of a coordinate information updating process.

FIG. 6 is a flow chart showing an example of an updating process of coordinate information in the present embodiment. For example, the case in which the coordinate values of a plurality of three-dimensional objects in the three-dimensional coordinate system are stored in the coordinate storing unit 20 is presupposed. In this case, the two-dimensional converting unit 22 converts the coordinate values of the three-dimensional coordinate system to the coordinate values of the two-dimensional coordinate system, thereby two-dimensionally displaying the plurality of three-dimensional objects on the display device 12.

In such a state, a user selects a certain object as an operation target and carries out an operation with respect to the object by using the input device 14. As a result, the operation information of the two-dimensional coordinate system with respect to the selected object is output from the input device 14. Herein, the action of selecting the object as the operation target can be carried out, for example, by clicking the object if the input device 14 is a mouse or by tapping the object if the input device 14 is a touchpad or a touch panel.

Then, the operation information receiving unit 24 receives the operation information output from the input device 14 in this manner (S601). The operation information determining unit 26 determines whether the received operation information is in accordance with the predetermined rule or not (S602). In other words, the operation information determining unit 26 determines whether the trajectory of the XY-coordinate values corresponding to the operation information is an approximately-circular trajectory or not.

If the determination result of the operation information determining unit 26 indicates that the operation information is not in accordance with the predetermined rule (S602: N), the coordinate updating unit 28 updates the xy-coordinate values of the object based on the trajectory of the coordinate values corresponding to the operation information (S603).

If the determination result of the operation information determining unit 26 indicates that the operation information is in accordance with the predetermined rule (S602: Y), the operation information receiving unit 24 further receives the operation information of the two-dimensional coordinate system (S604) after the determination of the operation information determining unit 26. Then, after the determination of the operation information determining unit 26, the coordinate updating unit 28 updates the z-coordinate value of the object based on the operation information of the two-dimensional coordinate system received within a predetermined period (S605). In other words, the coordinate updating unit 28 updates the z-coordinate value of the object based on the distance, direction, and speed of the approximately-circular trajectory of the XY-coordinate values corresponding to the operation information received after the determination. Specifically, if the trajectory of the XY-coordinate values corresponding to the operation information is a clockwise approximately-circular trajectory, the operation information determining unit 26 changes the z-coordinate value of the object toward the positive side in accordance with the distance and the speed of the trajectory. If the trajectory of the XY-coordinate values corresponding to the operation information is an anticlockwise approximately-circular trajectory, the operation information determining unit 26 changes the z-coordinate value of the object toward the negative side in accordance with the distance and the speed of the trajectory.

The direction and the speed of the trajectory of the XY-coordinate values corresponding to the operation information of the two-dimensional coordinate system are not required to be constant, but may be changed during the operation. In other words, the z-coordinate value of the object can be finely adjusted by changing the direction and the speed of the trajectory of the XY-coordinate values corresponding to the operation information during the operation. The coordinate updating unit 28 may cause the operation information of the two-dimensional coordinate system received upon the determination by the operation information determining unit 26 to be reflected to the updating amount of the z-coordinate value. For example, in the case in which switching to the updating process of the z-coordinate value is carried out when the trajectory of the XY-coordinate values corresponding to the operation information forms an approximate circle two times, the operation information determining unit 26 may update the z-coordinate value based on the distance, direction, and speed of the trajectory of the two rotations.

Then, the coordinate updating unit 28 updates the xyz-coordinate values, which are recorded in the coordinate storing unit 20, in accordance with the updated xy-coordinate values or z-coordinate value (S606). When the xyz-coordinate values recorded in the coordinate storing unit 20 are updated, the two-dimensional converting unit 22 converts the updated xyz-coordinate values to XY-coordinate values of the two-dimensional coordinate system (S607) and updates the two-dimensional display position of the object displayed by the display device 12 (S608).

While the input of the operation information with respect to the selected object is carried out, the process of updating the xy-coordinate values or the z-coordinate value based on the operation information (S601 to S608) is repeatedly executed (S609: N). The input of the operation information with respect to the object is finished when the selected state of the object is cancelled (S609: Y). Herein, the cancellation of the selected state of the object can be carried out by, for example, cancelling the click or clicking another object if the input device 14 is a mouse; or, if the input device 14 is a touchpad or a touch panel, the cancellation can be carried out by cancelling the tap or tapping another object.

In this manner, according to the coordinate information updating device 10 of the present embodiment, whether update of the xy-coordinate values is to be carried out or update of the z-coordinate value is to be carried out can be switched by determining whether the operation information of the two-dimensional coordinate system is in accordance with the predetermined rule or not. In other words, switching between the updating process of the xy-coordinate values of the object and the updating process of the z-coordinate value of the object can be switched while remaining in the moving operation of the two-dimensional coordinate system (X, Y) without carrying out a cumbersome switching operation.

Figure 7:
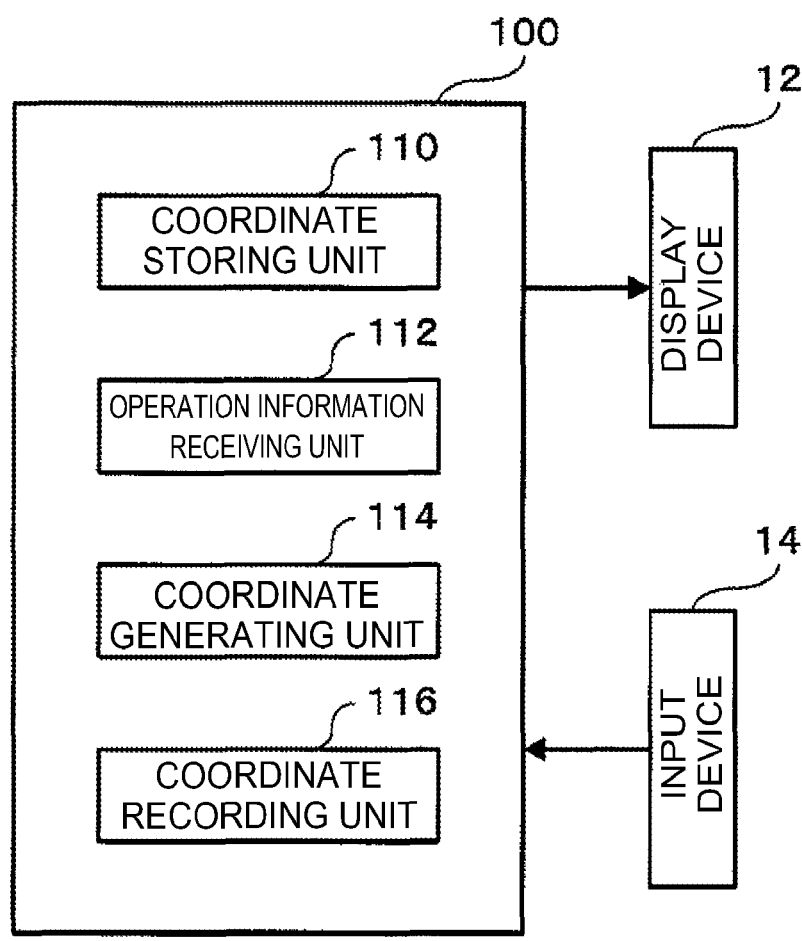
FIG. 7 includes a drawing showing an example of the functional configuration of a coordinate information generating device.

FIG. 7 is a drawing showing the functional configuration of a coordinate information generating device which is an embodiment of the present disclosure. The coordinate information generating device 100 is an electronic device capable of generating the coordinate values of a three-dimensional object, which is two-dimensionally displayed by the display device 12, in the three-dimensional coordinate system (x, y, z) in accordance with the operation information of the two-dimensional coordinate system (X, Y) output from the input device 14.

As shown in FIG. 7, the coordinate information generating device 100 is composed of: a coordinate storing unit 110, an operation information receiving unit 112, a coordinate generating unit 114, and a coordinate recording unit 116. The coordinate information generating device 100 can have a hardware configuration similar to that of the coordinate information updating device 10 of the embodiment described above, and the coordinate storing unit 110 can be composed by using the memory 42 or the hard disk drive 44. Therefore, the operation information receiving unit 112, the coordinate generating unit 114, and the coordinate recording unit 116 can be realized by executing a program(s) stored in the memory 42 by the CPU 40.

The coordinate storing unit 110 stores the xyz-coordinate values of the two-dimensionally-displayed three-dimensional object in the three-dimensional coordinate system. The xyz-coordinate values in the three-dimensional coordinate system are generated in accordance with the operations of a user.

The operation information receiving unit 112 receives the operation information of the two-dimensional coordinate system with respect to the three-dimensional object, which is displayed by the display device 12, from the input device 14.

The coordinate generating unit 114 generates a z-coordinate value of the object in the three-dimensional coordinate system based on the operation information of the two-dimensional coordinate system with respect to the three-dimensional object and, based on the generated z-coordinate value, generates xy-coordinate values of the object in the three-dimensional coordinate system. Specifically, the coordinate generating unit 114 generates the z-coordinate value based on the distance, direction, and speed of the trajectory of XY-coordinate values corresponding to the operation information. In the present embodiment, the coordinate generating unit 114 generates the z-coordinate value by a clockwise or anticlockwise approximately-circular operation as exemplified in FIG. 4. For example, if the trajectory of the XY-coordinate values corresponding to the operation information is circular, the change amount of the z-coordinate value can be caused to be proportional to the number of rotation of the circles. Alternatively, for example, even when the number of rotation of the trajectory of the XY-coordinate values corresponding to the operation information is the same, the change amount of the z-coordinate value per one rotation can be changed in accordance with the moving speed thereof. In other words, for example, even if the circles have the same trajectory, the change amount of the z-coordinate value per one rotation can be caused to be small when the speed is slow, and the change amount of the z-coordinate value per one rotation can be caused to be large when the speed is fast. Note that the speed may be an angular speed or linear speed. Alternatively, for example, even when the number of rotation of the trajectory of the XY-coordinate values corresponding to the operation information is the same, the change amount of the z-coordinate value per one rotation can be changed in accordance with the size of the circle.

The coordinate recording unit 116 records the coordinate values of the object in the three-dimensional coordinate system, which are generated by the coordinate generating unit 114, into the coordinate storing unit 110.

Figure 8:
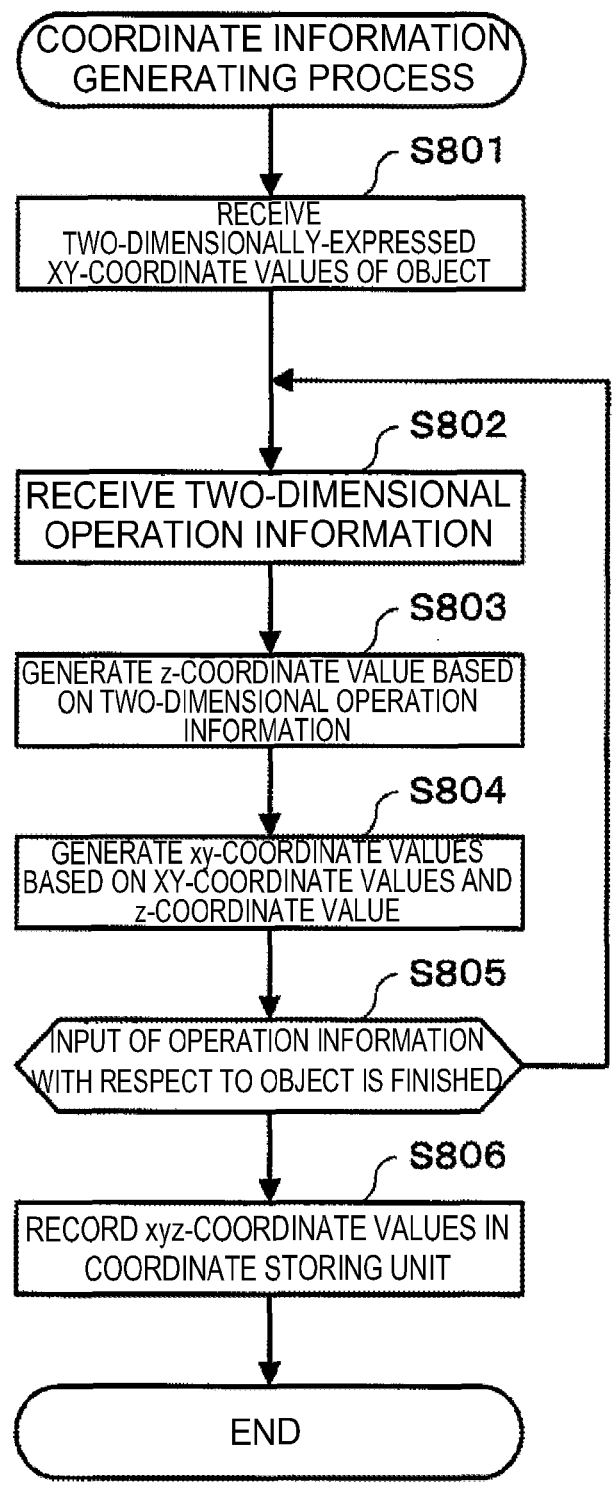
FIG. 8 includes a flow chart showing an example of a coordinate information generating process.

FIG. 8 is a flow chart showing an example of a coordinate information generating process in the present embodiment. Herein, the state in which a three-dimensional object of which coordinate values in the three-dimensional coordinate system is unknown is two-dimensionally displayed by the display device 12 is presupposed.

In this state, the operation information receiving unit 112 receives the XY-coordinate values of a particular point of the object in the two-dimensional coordinate system, wherein the point serves as a target for generating the coordinate values thereof in the three-dimensional coordinate system (S801). The particular point of the object can be specified by selecting the particular point of the two-dimensionally-displayed object by the input device 14. Herein, the action of selecting the particular point of the object can be carried out, for example, by clicking the target point if the input device 14 is a mouse; or, if the input device 14 is a touchpad or a touch panel, the action can be carried out by tapping the target point.

Furthermore, the operation information receiving unit 112 receives the operation information of the two-dimensional coordinate system with respect to the selected particular point (S802). Then, the coordinate generating unit 114 generates the z-coordinate value of the selected particular point based on the received operation information (S803). In the present embodiment, the coordinate generating unit 114 generates the z-coordinate value of the selected particular point based on the distance, direction, and speed of the approximately-circular trajectory of the XY-coordinate values corresponding to the operation information. Specifically, if the XY-coordinate values corresponding to the operation information form a clockwise approximately-circular trajectory as exemplified in FIG. 4 (*a*), the coordinate generating unit 114 changes the z-coordinate value in a positive direction from an initial value (for example, zero) in accordance with the distance and the speed of the trajectory. If the XY-coordinate values corresponding to the operation information form an anticlockwise approximately-circular trajectory as exemplified in FIG. 4 (*b*), the coordinate generating unit 114 changes the z-coordinate value in a negative direction from the initial value (for example, zero) in accordance with the distance and the speed of the trajectory.

Then, based on the XY-coordinate values of the selected particular point and the generated z-coordinate value, the coordinate generating unit 114 generates the xy-coordinate values thereof in the three-dimensional coordinate system (S804). Herein, when the angle formed by the x-axis and the z-axis when the three-dimensional coordinate system is displayed on a two-dimensional screen in the pseudo manner is $\theta$, the xy-coordinate values in the three-dimensional coordinate system can be obtained by $x=X+z\cdot\cos\theta$, $y=Y+z\cdot\sin\theta$. Note that the coordinate generating unit 114 can display the xyz-coordinate values of the three-dimensional coordinate system by the display device 12 during generation of the values with respect to the selected particular point.

While the input of the operation information with respect to the selected object is carried out, the process of updating the z-coordinate value and the xy-coordinate values based on the operation information (S802 to S804) is repeatedly executed (S805: N). Note that the input of the operation information with respect to the object is finished when the selected state of the particular point of the object is cancelled (S805: Y). Herein, the cancellation of the selected state of the particular point of the object can be carried out by, for example, cancelling the click or clicking another point if the input device 14 is a mouse; or, if the input device 14 is a touchpad or a touch panel, the cancellation can be carried out by cancelling the tap or tapping another point.

Then, the coordinate recording unit 116 records the generated xyz-coordinate values of the three-dimensional system in the coordinate storing unit 110 in association with the information representing the particular point of the object such as XY-coordinate values thereof in the two-dimensional coordinate system (S806).

In this manner, according to the coordinate information generating device 100 of the present embodiment, the coordinate values of the particular point of the two-dimensionally-displayed three-dimensional object in the three-dimensional coordinate system can be generated while remaining in the operation of the two-dimensional coordinate system (X, Y) without carrying out a cumbersome switching operation between the two-dimensional operation and the three-dimensional operation. Therefore, various processes in three-dimensional space using the coordinate values of the three-dimensional coordinate system can be carried out. For example, the position of an object in three-dimensional space can be changed by using the generated coordinate values of the three-dimensional coordinate system by the method shown in the embodiment described above, or the direction of a three-dimensional object upon two-dimensional display can be changed.

The present disclosure is not limited to the above described embodiments, and various modifications, additions, and omission can be made by those skilled in the art without deviating from the idea and scope expressed by the claims.

For example, in one embodiment, the operation information determining unit 26 determines that the update of the z-coordinate value is to be carried out when the trajectory of the coordinate values of the two-dimensional coordinate system corresponding to the operation information is approximately circular; however, the predetermined rule for determining the operation information is not limited thereto.

Figure 9:
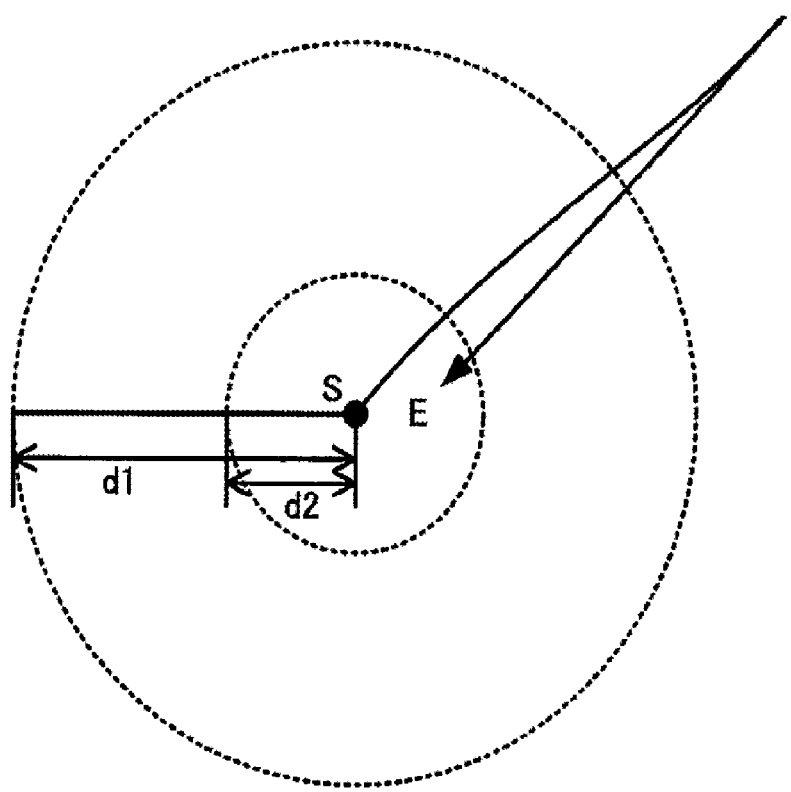
FIG. 9 includes a drawing showing an example of switching to an updating process of the z-coordinate value by the trajectory of the coordinate values of the two-dimensional coordinate system different from an approximately-circular shape.

For example, the operation information determining unit 26 may determine that the update of the z-coordinate value is to be carried out when the trajectory of the XY-coordinate values corresponding to the operation information reaches an end point E via a position distant from a start point S by a predetermined distance d1 or more, wherein the distance of the end point E from the start point S is within a predetermined range d2 (<d1) as shown in FIG. 9. The reason therefor is that, as well as the case of the approximately-circular shape, the possibility of carrying out such an operation is conceived to be low when the xy-coordinate values are to be normally updated.

Alternatively, for example, the operation information determining unit 26 may determine that the update of the z-coordinate value is to be carried out when a plurality of trajectories of XY-coordinate values corresponding to the operation information are predetermined trajectories. For example, if the input device 14 is a touchpad or a touch panel, the determination that the update of the z-coordinate value is to be carried out may be made when a pinching action or an expanding action is carried out by two fingers 120 and 122 with respect to a selected object as exemplified in FIG. 10. The reason therefor is that, normally, there is no possibility that the xy-coordinate values are updated based on a plurality of simultaneously generated trajectories. Then, after it is determined that the update of the z-coordinate value is to be carried out, the coordinate updating unit 28 may update the z-coordinate value based on the distance, direction, and speed of the trajectories of the XY-coordinate values corresponding to the pinching action or expanding action.

In the first embodiment, the trajectory of the XY-coordinate values corresponding to the operation information upon switching to the updating process of the z-coordinate value and the trajectory of the XY-coordinate values corresponding to the operation information upon updating of the z-coordinate value are both approximately-circular trajectories; however, the rules of the operation information upon switching and upon update are not required to be the same. For example, switching to the updating process of the z-coordinate value may be carried out when the trajectory of the XY-coordinate values corresponding to the operation information is approximately circular; and, then, for example, the z-coordinate value may be updated in accordance with the distance, direction, and speed of an approximately-linear trajectory of the XY-coordinate corresponding to operation information. The same also applies to the case in which it is determined that the update of the z-coordinate value is to be carried out when the plurality of trajectories corresponding to the operation information are predetermined trajectories.

The embodiments and the technical characteristics of various modifications explained above can be employed in arbitrary combinations.

REFERENCE SIGNS LIST

10 COORDINATE INFORMATION UPDATING DEVICE
12 DISPLAY DEVICE
14 INPUT DEVICE
20 COORDINATE STORING UNIT
22 TWO-DIMENSIONAL CONVERTING UNIT
24 OPERATION INFORMATION RECEIVING UNIT
26 OPERATION INFORMATION DETERMINING UNIT
28 COORDINATE UPDATING UNIT
40 CPU
42 MEMORY
44 HARD DISK DRIVE
46 DISPLAY INTERFACE
48 INPUT INTERFACE
100 COORDINATE INFORMATION GENERATING DEVICE
110 COORDINATE STORING UNIT
112 OPERATION INFORMATION RECEIVING UNIT
114 COORDINATE GENERATING UNIT
116 COORDINATE RECORDING UNIT

The invention claimed is:

1. A coordinate information update device, comprising:
a coordinate storage unit configured to store a coordinate value of an object in a three-dimensional coordinate system, the object configured to be displayed on a two dimensional display;
a two-dimensional conversion unit configured to convert three-dimensional coordinate values to coordinate values of a two-dimensional coordinate system;
an operation information receiver unit configured to receive operation information of the two-dimensional coordinate system from an input device that is separate from the display, the operation information used to update xy-coordinate values of the three-dimensional coordinate system with respect to the object;
an operation information determination unit configured to determine whether the operation information to update the xy-coordinate values of the three-dimensional coordinate system is in accordance with a particular rule; and
a coordinate update unit configured, based on a result of the determination of the operation information determination unit, to:
update the xy-coordinate values of the three-dimensional coordinate system with respect to the object in accordance with the operation information, in response to the operation information not being in accordance with the particular rule, and
update a z-coordinate value of the three-dimensional coordinate system with respect to the object in accordance with the operation information to adjust a shape of the object in a z-coordinate direction and not update the xy-coordinate values of the three-dimensional coordinate system, in response to the operation information being in accordance with the particular rule.

2. The coordinate information update device according to claim 1, wherein the particular rule is a rule that a trajectory of the xy-coordinate values of the two-dimensional coordinate system corresponding to the operation information includes a particular trajectory.

3. The coordinate information update device according to claim 2, wherein the particular rule includes that the trajectory of the xy-coordinate values of the two-dimensional coordinate system corresponding to the operation information includes the particular trajectory within a particular period of time.

4. The coordinate information update device according to claim 2, wherein the particular rule includes that the trajectory of the xy-coordinate values of the two-dimensional coordinate system corresponding to the operation information continuously includes the particular trajectory a plurality of times.

5. The coordinate information update device according to claim 2, wherein the particular trajectory reaches an end point within a particular range via a point distant from a start point by a particular distance, a distance of the end point within the particular range from the start point being shorter than the particular distance.

6. The coordinate information update device according to claim 5, wherein the particular trajectory is an approximately-circular trajectory.

7. The coordinate information update device according to claim 1, wherein, in response to the operation information being determined to be in accordance with the particular rule, the coordinate update unit is configured to update the z-coordinate value of the object based on at least one of a distance, a direction, or a speed of a trajectory of the xy-coordinate values of the two-dimensional coordinate system corresponding to the operation information.

8. A coordinate information update method, comprising:
two-dimensionally displaying an object on a screen of a two-dimensional coordinate system based on xyz-coordinate values of the object in a three-dimensional coordinate system;
receiving operation information of the two-dimensional coordinate system from an input device separate from the screen, the operation information used to update the xy-coordinate values of the object in the three-dimensional coordinate system;
determining whether the operation information to update the xy-coordinate values of the object in the three-dimensional coordinate system is in accordance with a particular rule; and
based on a result of the determination:
updating the xy-coordinate values of the object in the three-dimensional coordinate system in accordance with the operation information, in response to the operation information not being in accordance with the particular rule, and updating the z-coordinate value of the object in the three-dimensional coordinate system in accordance with the operation information to adjust a shape of the object in a z-coordinate direction and not updating the xy-coordinate values of the object in the three-dimensional coordinate system, in response to the operation information being in accordance with the particular rule.

9. The coordinate information update method according to claim 8, wherein the particular rule is a rule that a trajectory of the xy-coordinate values of the two-dimensional coordinate system corresponding to the operation information includes a particular trajectory.

10. The coordinate information update method according to claim 9, wherein the particular rule includes that the trajectory of the xy-coordinate values of the two-dimensional coordinate system corresponding to the operation information includes the particular trajectory within a particular period of time.

11. The coordinate information update method according to claim 9, wherein the particular rule includes that the trajectory of the xy-coordinate values of the two-dimensional coordinate system corresponding to the operation information continuously includes the particular trajectory a plurality of times.

12. The coordinate information update method according to claim 9, wherein the particular trajectory reaches an end point within a particular range via a point distant from a start point by a particular distance, a distance of the end point within the particular range from the start point being shorter than the particular distance.

13. The coordinate information update method according to claim 12, wherein the particular trajectory is an approximately-circular trajectory.

14. The coordinate information update method according to claim 8, wherein, in response to the operation information being determined to be in accordance with the particular rule, updating the z-coordinate value of the object comprises updating the z-coordinate value of the object based on at least one of a distance, a direction, or a speed of a trajectory of the xy-coordinate values of the two-dimensional coordinate system corresponding to the operation information.

15. A coordinate information update device, comprising:

a coordinate storage unit configured to store a coordinate value of an object in a three-dimensional coordinate system, the object configured to be displayed on a two-dimensional display;

a two-dimensional conversion unit configured to convert three-dimensional coordinate values to coordinate values of a two-dimensional coordinate system;

an operation information receiver unit configured to receive operation information of the two-dimensional coordinate system from an input device that is separate from the display, the operation information used to update xy-coordinate values of the three-dimensional coordinate system with respect to the object;

an operation information determination unit configured to determine whether the operation information to update the xy-coordinate values of the three-dimensional coordinate system is in accordance with a particular rule, wherein the particular rule includes a rule that a trajectory of xy-coordinate values of the two-dimensional coordinate system corresponding to the operation information includes a particular trajectory within a particular period of time and that the trajectory of the xy-coordinate values of the two-dimensional coordinate system corresponding to the operation information continuously includes the particular trajectory a plurality of times; and a coordinate update unit configured to, based on a result of the determination of the operation information determination unit, update the xy-coordinate values of the three-dimensional coordinate system with respect to the object in accordance with the operation information, in response to the operation information not being in accordance with the particular rule, and update a z-coordinate value of the three-dimensional coordinate system with respect to the object in accordance with the operation information to adjust a shape of the object in a z-coordinate direction and maintain the xy-coordinate values of the three-dimensional coordinate system, in response to the operation information being in accordance with the particular rule.

* * * * *

UNITED STATES PATENT AND TRADEMARK OFFICE
CERTIFICATE OF CORRECTION

| | | |
|---|---|---|
| PATENT NO. | : 9,075,430 B2 | Page 1 of 1 |
| APPLICATION NO. | : 13/392966 | |
| DATED | : July 7, 2015 | |
| INVENTOR(S) | : Oki et al. | |

It is certified that error appears in the above-identified patent and that said Letters Patent is hereby corrected as shown below:

In Column 1, Line 9, delete "35 U.S.C. 371" and insert -- 35 U.S.C. § 371 --, therefor.

In Column 1, Line 11, delete "35 U.S.C. 119(a)" and insert -- 35 U.S.C. § 119(a) --, therefor.

In Column 4, Line 17, delete "device is," and insert -- device 10 is, --, therefor.

Signed and Sealed this
Sixteenth Day of February, 2016

Michelle K. Lee
*Director of the United States Patent and Trademark Office*